United States Patent
Lee et al.

(10) Patent No.: US 10,310,932 B2
(45) Date of Patent: Jun. 4, 2019

(54) USING A CONCENTRATION RISK OF A COMPUTING RESOURCE TO DEFINE AFFINITY AND ANTI-AFFINITY WORKLOADS

(71) Applicant: Bank of America Corporation, Charlotte, NC (US)

(72) Inventors: Jisoo Lee, Chesterfield, NJ (US); Todd M. Goodyear, New Hope, PA (US)

(73) Assignee: Bank of America Corporation, Charlotte, NC (US)

( * ) Notice: Subject to any disclaimer, the term of this patent is extended or adjusted under 35 U.S.C. 154(b) by 136 days.

(21) Appl. No.: 15/405,888

(22) Filed: Jan. 13, 2017

(65) Prior Publication Data

US 2018/0203751 A1    Jul. 19, 2018

(51) Int. Cl.
*G06F 11/07* (2006.01)
*G06F 21/50* (2013.01)
*G06F 11/30* (2006.01)
*G06F 11/34* (2006.01)

(52) U.S. Cl.
CPC ........ *G06F 11/079* (2013.01); *G06F 11/0709* (2013.01); *G06F 11/3006* (2013.01); *G06F 11/3051* (2013.01); *G06F 11/3442* (2013.01); *G06F 21/50* (2013.01); *G06F 11/0754* (2013.01); *G06F 11/0793* (2013.01)

(58) Field of Classification Search
CPC .............. G06F 11/079; G06F 11/0793; G06F 11/0751; G06F 11/14; G06F 11/30; G06F 11/3051; G06F 11/1464; G06F 11/36
See application file for complete search history.

(56) References Cited

U.S. PATENT DOCUMENTS

| | | | |
|---|---|---|---|
| 8,209,687 B2 | 6/2012 | Yuyitung et al. | |
| 8,862,727 B2 * | 10/2014 | Jayachandran | ..... G06F 11/0754 709/224 |
| 8,862,728 B2 * | 10/2014 | Jayachandran | ..... G06F 11/0754 709/224 |
| 9,348,724 B2 * | 5/2016 | Ota | ..................... G06F 9/45558 |
| 9,373,096 B2 | 6/2016 | Franco | |
| 9,455,881 B2 * | 9/2016 | Boerner | .............. H04L 41/5041 |

(Continued)

FOREIGN PATENT DOCUMENTS

WO    WO /2016090485    12/2015

*Primary Examiner* — Nadeem Iqbal
(74) *Attorney, Agent, or Firm* — Michael A. Springs

(57) ABSTRACT

In certain embodiments, a system comprises processing circuitry and memory comprising logic. The processing circuitry is operable to execute the logic whereby the system is operable to monitor a pool of shared computing resources, determine a concentration risk associated with a first computing resource in the pool, and perform an action if the concentration risk exceeds a threshold. Each computing resource within the pool of shared computing resources is capable of being allocated dynamically in order to support one or more applications. The concentration risk is based on an extent to which the one or more applications have upstream or downstream dependencies on the first computing resource. The action comprises communicating a notification to a system operator and/or initiating a remediation step configured to reduce the concentration risk associated with the first computing resource.

19 Claims, 3 Drawing Sheets

(56) References Cited

U.S. PATENT DOCUMENTS

| | | | |
|---|---|---|---|
| 2011/0166906 A1* | 7/2011 | Hardee | G06Q 10/06 705/7.28 |
| 2015/0286519 A1* | 10/2015 | Huang | H04L 67/1012 714/47.3 |
| 2015/0381410 A1 | 12/2015 | Strassner | |
| 2017/0083397 A1* | 3/2017 | Guney | G06F 11/0793 |

* cited by examiner

USING A CONCENTRATION RISK OF A COMPUTING RESOURCE TO DEFINE AFFINITY AND ANTI-AFFINITY WORKLOADS

TECHNICAL FIELD

The present disclosure relates generally to computer networks and, more specifically, certain embodiments relate to using a concentration risk of a computing resource to define affinity and anti-affinity workloads.

BACKGROUND

Networks allow users to access various types of computing resources, which may include hardware resources and/or software resources. Examples of hardware resources include computer networks, servers, memory, and so on. Examples of software resources include applications, services, data, and so on. The computing resources may be shared among a number of users and allocated dynamically on an as-needed basis. As an example, in a cloud-based network, users may connect to a cloud service via the Internet, and the cloud service may dynamically allocate server processing power, memory storage capacity, and/or other resources that may be used to host software from the cloud.

SUMMARY

In certain embodiments, a system comprises processing circuitry and memory comprising logic. The processing circuitry is operable to execute the logic whereby the system is operable to monitor a pool of shared computing resources, determine a concentration risk associated with a first computing resource in the pool, and perform an action if the concentration risk exceeds a threshold. Each computing resource within the pool of shared computing resources is capable of being allocated dynamically in order to support one or more applications. The concentration risk is based on an extent to which the one or more applications have upstream or downstream dependencies on the first computing resource. The action comprises communicating a notification to a system operator and/or initiating a remediation step configured to reduce the concentration risk associated with the first computing resource.

Certain embodiments may present one or more technical advantages. Certain embodiments may allow for improved stability and/or resiliency of computer networks. Certain embodiments may allow for improved computing performance, for example, by detecting problems in a computer network that could introduce latencies or otherwise degrade performance. As an example, certain embodiments determine when utilization is disproportionately concentrated on a particular computing resource so that steps can be taken to distribute the load among other computing resources. Certain embodiments allow for analyzing upstream and downstream dependencies determined at a physical layer and/or logical layer. Thus, upstream and downstream concentration risks can be identified that could otherwise go undetected. For example, enterprises that apply anti-affinity rules at an application level may still be exposed to underlying concentration risks that can be detected using the systems and methods disclosed herein. Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
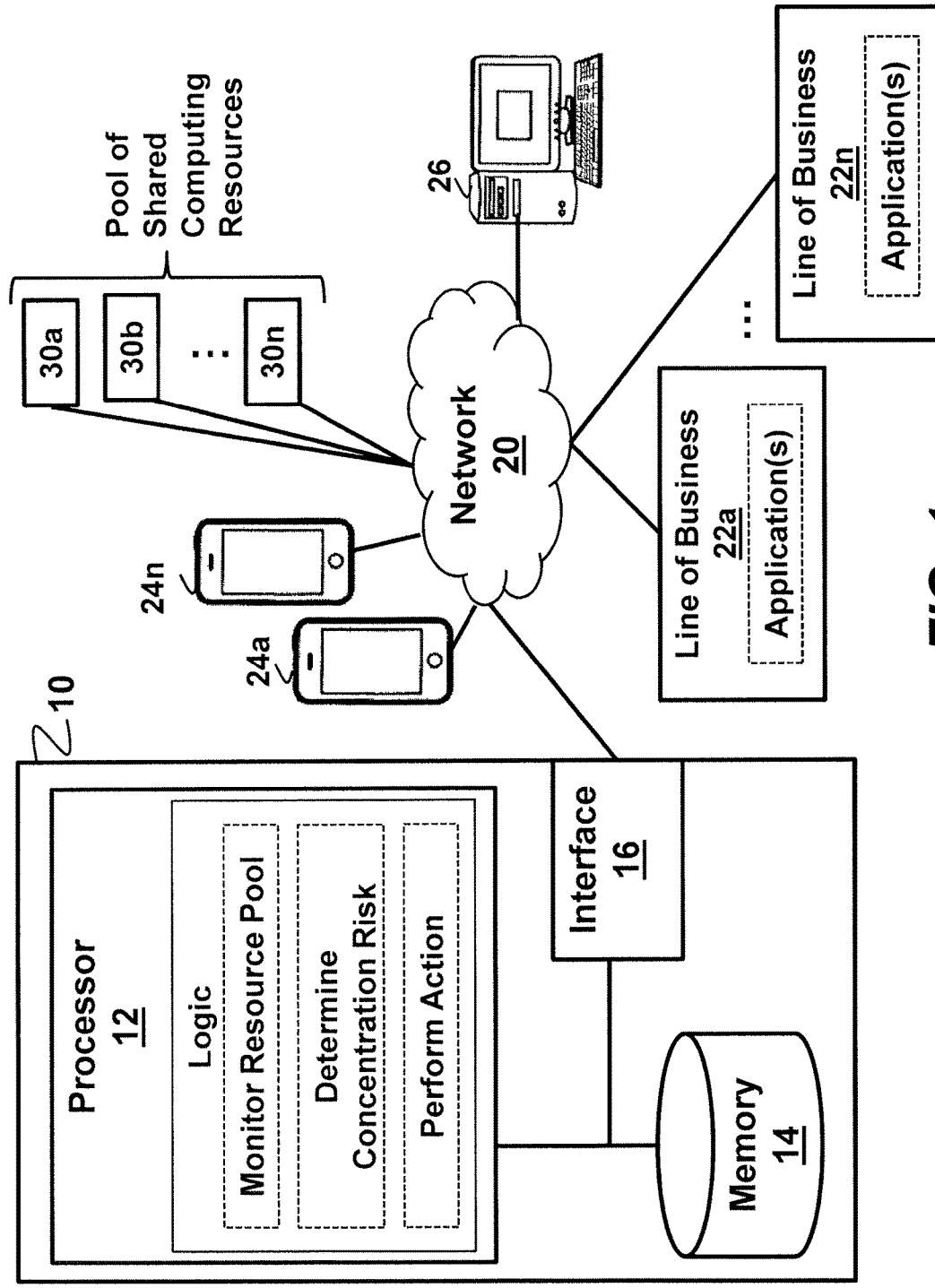
FIG. 1 illustrates an example of a system for determining a concentration risk of a computing resource, in accordance with certain embodiments of the present disclosure.

Computers often rely on resources accessed via a network in order to support applications. The resources may be allocated from a pool that supports a number of computers. In a massively scaled operation, the number of computers supported could reach into the millions or billions. A goal of a well-designed network should be to maximize performance, for example, by minimizing round trip time and providing mutually exclusive processing threads in order to prevent a single point of failure from affecting multiple customers.

Computers can be configured with resiliency and/or anti-affinity rules designed to reduce interdependencies within the network. The rules prevent various applications from vying for the same computing resources at the same time. Unfortunately, these rules may fail to detect all of the interdependencies within the network. As an example, an enterprise may include several lines of business, such as a first line of business and a second line of business. The first line of business may run certain computer applications that access a first set of servers and the second line of business may run different computer applications that access a second set of servers. Despite these efforts to run applications on separate servers, if the first and second lines of business both depend on the same middle or back office systems, both lines of business would be exposed to errors occurring in the middle or back office systems.

As a more specific example, suppose a bank includes a first line of business for investment accounts, a second line of business for checking and savings accounts, a third line of business for loans, and so on. The first line of business may provide customers with access to a trading platform for buying and selling stocks. The second line of business may provide customers with access to an online banking program for making deposits and withdrawals from checking and savings accounts. The third line of business may provide customers with a loan platform for applying for loans and making loan payments. Resiliency and/or anti-affinity rules may cause the trading platform, the online banking platform, and the loan platform to run on different servers. However, the network may have upstream or downstream dependencies that affect more than one of the platforms.

As an example, all three platforms might generate logs that are periodically stored in a database. The port to which each platform reports its logs may be allocated and deallocated dynamically according to when the platform determines to store a log. The ports can be configured in a one-to-many relationship such that each port is capable of serving more than one platform. Over time, the allocation of ports may shift and multiple applications from multiple platforms may end up being assigned to the same port. Suppose that the assigned port experiences an error or service degradation, for example, due to the load on the port exceeding the capacity of the port. All of the applications that depend on the port would be impacted even if the applications use different hardware at the application level. Thus, analyzing the network at the application level would fail to uncover the point in the infrastructure that has a critical overlap in resource utilization. Accordingly, embodiments of the present disclosure allow for analyzing upstream and/or downstream dependencies to identify resources experiencing concentrated utilization.

Situations that lead to concentration are not unusual. As one example, migrating from a legacy platform to a new platform may involve shrinking resources available to the legacy platform and grouping the resources together. The applications that are unable to migrate end up sharing the small number of resources available to the legacy platform. If the legacy platform fails, each of the applications running on the legacy platform will be affected. Moreover, situations that lead to concentration tend to be getting worse as more and more workload is virtualized using cloud-based resources, virtual machines, microservices, software defined networking, etc. Virtualizing workload can cause a disconnect between an enterprise that provides applications to its employees and/or customers (such as a bank that provides an online banking application to its customers) and where resources are actually processed (such as a third party device that provides logical and/or physical resources on which the application is run). Unlike conventional networks that would typically run an application using a static, dedicated infrastructure located on the enterprise's premises, virtualizing the workload means that at any point of day any part of the application could be hosted in a different location on different hardware. Dynamically shifting the load on a continuous basis can create a concentration risk.

To identify resources that are experiencing concentrated utilization, certain embodiments determine a concentration risk. Determining the concentration risk can allow a system operator to provide fully resilient, front-to-back segmentation processing, for example, to increase stability at the logical layer and the physical layer. Embodiments of the present disclosure and its advantages are further described with respect to FIGS. 1 through 3 of the drawings, like numerals being used for like and corresponding parts of the various drawings.

FIG. 1 illustrates an example of a system 10 for determining a concentration risk of a computing resource, in accordance with certain embodiments of the present disclosure. System 10 includes processing circuitry (e.g., which can include one or more processor(s) 12), memory 14, and interface(s) 16. In general, processor 12 controls the operation and administration of system 10 by processing information received from memory 14 and/or interface 16. Memory 14 stores, either permanently or temporarily, data, operational software, or other information for processor 12. Interface 16 receives input, sends output, processes the input and/or output and/or performs other suitable operations. An interface 16 may comprise hardware and/or software.

Interface 16 connects system 10 to network 20. Network 20 may facilitate communication between one or more lines of business 22 of an enterprise, a plurality of user devices 24, a system operator 26, and a pool of shared computing resources 30. The one or more lines of business 22 provide applications to user devices 24. As an example, the enterprise could be a bank, and the lines of business 22 could include a first line of business 22a for investment accounts, a second line of business 22b for checking and savings accounts, and a third line of business 22c for loans, and so on. Applications that lines of business 22a, 22b, and 22c provide to user devices 24 could include a trading platform for buying and selling stocks, an online banking program for making deposits and withdrawals from checking and savings accounts, and a loan platform for applying for loans and making loan payments, respectively.

The computing resources 30a, 30b, . . . 30n are capable of being allocated dynamically in order to support one or more applications from one or more lines of business 22. As an example, suppose that a user holds an investment account with first line of business 22a. The user may interact with user device 24a to initiate a session with the trading platform application of line of business 22a in order to purchase stocks. Line of business 22a may determine that additional processing power is required to process the purchase of stocks. A processor, such as computing resource 30a, can be dynamically allocated from the pool of shared computing resources to support the purchase of stocks via the trading application.

System 10 may refer to any suitable hardware and/or software configured to perform the described functionality, such as a server (e.g., network server, remote server, web server, or file server, etc.), a mainframe, a host computer, a workstation, a personal computer, or any other suitable device. Components of system 10 may be implemented using shared hardware or separate hardware. Although FIG. 1 illustrates system 10 as separate from lines of business 22a . . . 22n, in other embodiments system 10 (or components thereof) could be located within a line of business 22 and/or may share hardware used to run applications of the line of business 22.

Examples of interfaces 16 include user interfaces and network interfaces. Examples of user interfaces include one or more graphical user interfaces (GUIs), displays, buttons, printers, microphones, speakers, cameras, scanners, credit card readers, check readers, and so on. Network interfaces receive information from or transmit information through a network (e.g., network 20), perform processing of information, communicate with other devices, or any combination of the preceding. Network interfaces may comprise any port or connection, real or virtual, wired or wireless, including any suitable hardware and/or software, including protocol conversion and data processing capabilities, to communicate through a LAN, WAN, or other communication system that allows processor 12 to exchange information with or through a network.

Processor 12 communicatively couples to interface(s) and memory, and includes any hardware and/or software that operates to control and process information. The processor may be a programmable logic device, a microcontroller, a microprocessor, any suitable processing device, or any suitable combination of the preceding. Processor 12 may execute logic stored in memory 14. The logic is configured to perform functionality described herein. As an example, processor 12 may execute logic configured to monitor a computing resource associated with a pool of shared computing resources, determine a concentration risk associated with the resource, and/or perform an action in response to determining that the concentration risk exceeds a threshold.

In certain embodiments, the logic is configured to perfoim the method described below with respect to FIG. 2.

Memory 14 includes any one or a combination of volatile or non-volatile local or remote devices suitable for storing information. For example, memory may include Read Only Memory ("ROM"), Random Access Memory ("RAM"), magnetic storage devices, optical storage devices, or any other suitable information storage device or a combination of these devices. Memory may include any suitable logic. Logic generally refers to rules, algorithms, code, tables, and/or other suitable instructions embodied in a non-transitory, computer-readable storage medium for performing the described functions and operations when executed by a processor 12. An example of logic may include an application run by user device 24, such as an application that an employee of the enterprise runs from his or her computer.

Network 20, lines of business 22, user devices 24, system operator 26, and computing resources 30 may each comprise any suitable hardware and/or software, such as any processing circuitry (e.g., which may comprise one or more processors), memory, and/or interfaces required to perform the described functionality. Network 20 represents any suitable network(s) operable to facilitate communication between system 10, lines of business 22, user devices 24, system operator 26, and/or computing resources 30. Network 20 may include any interconnecting system capable of transmitting audio, video, signals, data, messages, or any combination of the preceding. Network 20 may include all or a portion of a public switched telephone network (PSTN), a cellular network, a base station, a gateway, a public or private data network, a LAN, a MAN, a WAN, a WWAN, a local, regional, or global communication or computer network, such as the Internet, a wireline or wireless network, an enterprise intranet, or any other suitable communication link, including combinations thereof, operable to facilitate communication between the components.

A line of business 22 may generally refer to a subgroup within in an enterprise that uses computing resources 30 to support applications provided to user devices 24. Each line of business 22 may provide applications that are relevant to that business (e.g., an investment line of business may provide a trading platform application). In certain embodiments, the line of business 22 may use computing resources 30 from the pool of shared computing resources in order to supplement or expand the capabilities of a device dedicated to that line of business or an application thereof. Examples of dedicated devices could include a server, mainframe, host computer, workstation, personal computer, etc. Although FIG. 1 illustrates an enterprise comprising multiple lines of business, in other embodiments an enterprise may comprise a single line of business. More generally, the systems and methods described herein could be used in any system that dynamically allocates computing resources from a pool of shared computing resources (regardless of whether the applications supported by the computing resources originate from one or more enterprises or one or more lines of business within an enterprise).

User device 24 refers to any type of device communicating with system 10 through a network. Examples of user device 24 include a mobile phone, smart phone, tablet, laptop, personal computer, handheld device, etc. Certain user devices 24 may be used by customers of an enterprise, for example, to obtain services from the enterprise's customer-facing applications. Certain user devices 24 may be used by employees of the enterprise, for example, to access internal applications of the enterprise. In addition, certain user devices 24 may be used by employees of a line of business 22, for example, to access internal applications of that line of business 22. Thus, certain user devices 24 (such as employee devices) may optionally be located within line of business 22 and may access applications via an internal network.

In certain embodiments, system operator 26 may refer to a user device 24 associated with a system operator, such as an employee of the enterprise responsible for maintaining the network. System operator 26 may refer to a computer or other device that connects to system 10 via a network, or it may refer to a user interface that is integrated with system 10. System operator 26 may configure rules, parameters, thresholds, actions, and so on that system 10 uses to determine a concentration risk and/or to respond to the concentration risk. System operator 26 may receive notifications from system 10 in the event that system 10 determines a concentration event. In certain embodiments, system operator 26 may be required to have certain credentials or privileges in order to access system 10.

Computing resources 30 refer to any suitable hardware and/or software capable of being allocated dynamically in order to support one or more applications. Examples of computing resources can include a host, memory (e.g., a database, storage, random access memory, etc.), a name space, a load balancer, a network, a port, etc. As an example, the pool of shared computing resources 30 may comprise cloud-based processors, and the cloud-based processors may be allocated dynamically (on an as-needed basis) when line of business 22 executes an application that requires additional processing power.

For purposes of example and explanation, FIG. 1 depicts the network as including certain components. However, this disclosure recognizes that the network may include any suitable components. One of ordinary skill in the art will appreciate that certain components can be omitted and other components not mentioned herein can be added.

Figure 2:
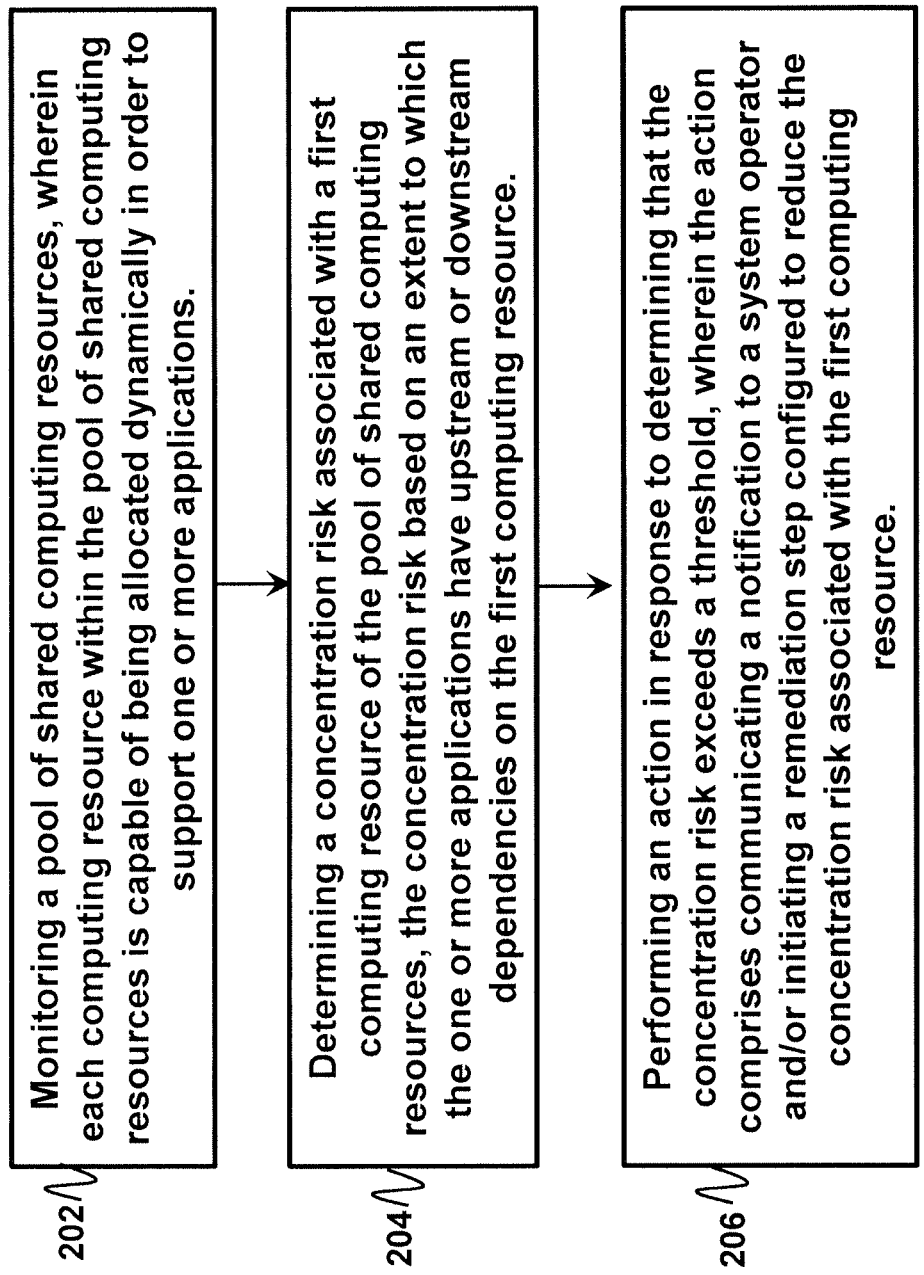
FIG. 2 illustrates an example of a method for determining a concentration risk of a computing resource, in accordance with certain embodiments of the present disclosure.

FIG. 2 illustrates an example of a method for determining a concentration risk of a computing resource, in accordance with certain embodiments of the present disclosure. At step 202, the method monitors a pool of shared computing resources, such as computing resources 30a, 30b, . . . 30n described with respect to FIG. 1. Each computing resource within the pool of shared computing resources is capable of being allocated dynamically in order to support one or more applications. Examples of applications may include computer programs that an enterprise uses to provide services to customers (such as a trading platform, online banking platform, or loan platform that a bank provides to its customers) or applications that an enterprise uses internally to support the business of the enterprise. The applications can include a number of different applications and/or multiple instances of the same application. In certain embodiments, the resources within the pool of shared computing resources can be determined using comprehensive system of record information or an asset inventory maintained by an enterprise.

At step 204, the method determines a concentration risk associated with a first computing resource of the pool of shared computing resources. As used herein, the computing resource is referred to as the "first" computing resource merely for purposes of explanation in order to differentiate one of the computer resources from the other computer resources. The first computing resource may refer to any suitable resource within the pool and does not require any particular arrangement or ordering of the computing resources.

The concentration risk is based on an extent to which the one or more applications have upstream or downstream dependencies on the first computing resource. Examples of upstream and downstream dependencies are further described below with respect to FIG. 3. The upstream dependencies may be determined at any suitable layer including, for example, the physical layer and/or logical layer.

As discussed above, resources within the pool of shared computing resources can be determined using system of record information or an asset inventory. In certain embodiments, the method evaluates the concentration risk for each computing resource in the pool according to its logical configuration or run time setting. Performing the analysis based on the logical configuration or run time setting may provide a real time understanding of whether there is concentrated utilization of the computing resource that results in a bad customer experience or high risk. Thus, the concentration risk is evaluated not only for a given service offering, but also upstream and/or downstream of the given service offering to address dependencies that affect the service offering.

As an example, the given service offering could be a trading platform that allows bank customers to buy and sell stocks. The trading platform may be part of a technology stack that includes a number of downstream dependencies. As examples, the trading platform may be dependent on a host, a database, a name space, a load balancer, storage, a network, etc. If a risk is detected with respect to one or more of the downstream dependencies, such as the load balancer, a concentration risk may be reported for the trading platform.

In certain embodiments, the concentration risk is determined at least in part based on the real-time utilization of the first computing resource. The real-time utilization can fluctuate dynamically. As an example, utilization can increase during times when the number of users sessions increases. As another example, utilization can increase during a predetermined network event (e.g., if logs are schedule to be reported every night at midnight, the utilization of logging resources may increase at midnight). The real-time utilization may be determined in any suitable manner, such as by dividing the current load on the resource by the capacity of the resource.

In certain embodiments, the concentration risk is determined at least in part based on a security risk associated with the first computing resource. For example, if a security application has identified the resource as at risk of having been exposed to or infected with malware (such as a bug with a known virus signature or a 0-day security attack), the concentration risk may increase for that computing resource or the applications that depend on it.

In certain embodiments, the concentration risk is determined at least in part based on a priority associated with the one or more applications that have the upstream or downstream dependencies on the first computing resource (i.e., the priority of the applications affected by the risk). As an example, a customer-facing application may be assigned a higher priority than an internal application. Thus, a concentration risk that affects the customer-facing application may be determined to be more critical than a concentration risk that only affects the internal application. Suppose that an application has a downstream dependency on a port that is 1.5 experiencing a real-time utilization rate of X. If the application is customer-facing, the real-time utilization rate of X may warrant generating a high concentration risk. However, if the application is internal only, the real-time utilization rate of X may warrant generating a low concentration risk. If more than one application is affected (e.g., a customer-facing and an internal application), the real-time utilization rate of X may warrant generating a high concentration risk, which is the risk level of the highest priority application affected by the risk. In certain embodiments, the risk may be further weighted based on the number of applications affected.

In certain embodiments, the concentration risk is determined at least in part based on detecting performance degradation associated with the one or more applications that have the upstream or downstream dependencies on the first computing resource. For example, the performance parameter determines when degradation in user experience occurs. The performance parameter may optionally analyze whether the degradation is caused by sharing a resource among too many applications. In certain embodiments, the performance parameter can consider whether the degradation occurs during a peak utilization time, such as when the stock market opens, during business hours, or during a scheduled traffic-generating event (e.g., if data is backed up or reconciled every day at midnight, an increase in resource utilization may be expected at that time). In certain embodiments, performance degradation during peak times when all resources are congested may indicate a capacity problem, whereas performance degradation during non-peak times when most resources are not congested may indicate a concentration problem on particular resources. In certain embodiments, determining the concentration risk based at least in part on performance degradation allows for detecting risks beyond the environment in which the application is configured and deployed.

In certain embodiments, the first computing resource comprises a cloud-based resource maintained by a cloud provider and the concentration risk is weighted based on a geographical location of the first computing resource and/or historical performance of the cloud provider. In a cloud-based computing environment, an enterprise may rely on a third party to provide certain computing resources. The enterprise does not necessarily have visibility into all of the systems on the cloud. However, the enterprise may still determine the concentration risk for internal resources within the enterprise, for external resources in the cloud to a depth that can be evaluated (e.g., based on analyzing inputs to and outputs from the cloud), and or a hybrid of internal and external resources. As an example, external/cloud resources can be analyzed at the service level and/or the geographic hosting level. A gearing ratio, weighting factor, or multiplier may be used to increase the concentration risk if an application uses resources of a less trustworthy cloud provider and/or is hosted in a higher risk geographical location. In certain embodiments, the trust level for a particular cloud provider may be determined and updated based on historical performance of the cloud provider, for example, based on the frequency and/or severity with which the cloud provider has failed to meet a service level set forth in a service level agreement between the cloud provider and the enterprise.

In certain embodiments, the concentration risk may be determined from a combination of any two or more factors described above and/or other suitable factors. The concentration risk may be determined at a particular instance and/or based on a frequency and/or duration according to which the first computing resource experiences problems, such as congestion, high utilization, performance degradation, etc.

In certain embodiments, the concentration risk may comprise a cumulative risk associated with multiple computing resources. As an example, suppose an online banking application has upstream or downstream dependencies on a first computing resource, such as a host, and a second computing resource, such as a database. Suppose that it has been determined that there is a low concentration risk associated with the host and that there is a medium concentration risk associated with the database. It may be determined that the concentration risk associated with the application is high because it is exposed to two levels of concentration risk. In certain embodiments, weighting factors may be used to determine the extent to which each level affects the cumulative risk. As an example, the concentration risk may comprise a first level risk (A) weighted by a first weighting factor (X) plus a second level risk (B) weighted by a second weighting factor (Y). Thus, the concentration risk may be represented as $[(X \times A)+(Y \times B)]$. The first level risk may be based on the extent to which the application(s) (e.g., the online banking application) has upstream or downstream dependencies on the first computing resource (e.g., the host) and the second level risk may be based on the extent to which the application(s) (e.g., the online banking application) has upstream or downstream dependencies on a second computing resource of the pool of shared computing resources (e.g., the database). In certain embodiments, the weighting factors can be determined based on rules or parameters configured by the system operator.

At step 206, the method performs an action in response to determining that the concentration risk exceeds a threshold. In certain embodiments, the action comprises communicating a notification to a system operator and/or initiating a remediation step configured to reduce the concentration risk associated with the first computing resource.

If the action comprises sending a notification, the notification may indicate that a concentration risk has been detected, indicator information (e.g., risk score), confidence level (e.g., known/confirmed risks may have a higher confidence level than unknown/potential risks), the affected computing resource, the affected application(s), the affected customers, performance information, the utilization rate of the affected computing resource, the utilization rate of other computing resources (such as computing resources similar to the affected computing resource/resources capable of providing redundancy for the affected computing resource), capacity information, duration information, frequency information, time of day information, information about whether the risk occurred during a peak time, remediation steps taken, remediation steps recommended (such as expand capacity or investigate a computing resource), a combination of any two or more of the preceding, and/or other suitable information.

In certain embodiments, the notification includes an indicator that indicates the concentration risk to a user, such as a system operator. In certain embodiments, the concentration risk may be determined based on an instantaneous measurement. In addition, or in the alternative, the concentration risk may be determined based on timing information, such as the duration of a congestion event on a particular resource and/or the frequency with which the resource has been experiencing congestion.

In certain embodiments, the indicator may be a binary value. For example, if the concentration risk exceeds a threshold, the indicator may be set to yes. If the concentration risk does not exceed the threshold, the indicator may be set to no. In certain embodiments, the indicator may comprise a score indicating the severity of the risk. The score may be presented in the form of a number (e.g., a number of points, a utilization percentage, etc.), a word (e.g., minor, major, critical), a color code (e.g., green, yellow, red), or any other suitable form. As one example, if the concentration risk does not exceed any threshold then the indicator may indicate that there is no risk; if the concentration risk exceeds a first threshold then the indicator may indicate that there is low risk; if the concentration risk exceeds the first threshold and a second threshold then the indicator may indicate that there is a medium risk; if the concentration risk exceeds the first and second thresholds and a third threshold then the indicator may indicate that there is a high risk. Although the example describes four risk levels (none, low, medium, high), other embodiments may include a different number of risk levels. In certain embodiments, the threshold(s) may be determined based on rules or parameters configured by the system operator.

As discussed above, in response to determining that the concentration risk exceeds a threshold, the action can include initiating a remediation step configured to reduce the concentration risk associated with the first computing resource. The remediation step can be initiated automatically in response to determining that a certain threshold has been exceeded. The action taken may depend on the severity of the risk. As an example, a low risk might only trigger sending a notification to a system operator while a high risk might trigger sending a notification to the system operator plus performing a remediation step.

If the action comprises performing a remediation step, the remediation step may allocate new sessions to a resource that is not experiencing a concentration risk, move a portion of the existing traffic from the resource that is experiencing a concentration risk to a resource that is not experiencing a concentration risk, initiate maintenance on the resource that is experiencing a concentration risk, take the resource that is experiencing a concentration risk offline (e.g., in response to determining that the resource is experiencing a problem that has caused it to become congested), and/or other suitable remediation step.

In certain embodiments, the concentration risk can be used to define and/or maintain affinity and anti-affinity workloads. In certain embodiments, the affinity and anti-affinity workloads may be defined/maintained automatically in response to detecting the concentration risk. In certain embodiments, the affinity and anti-affinity workloads may be defined/maintained by a system operator that modifies configuration rules, parameters, or software in response to information contained in a concentration risk notification. Affinity workloads may be allocated to applications for which it is acceptable to share upstream or downstream dependencies. Non-affinity workloads may be allocated to applications for which it is not acceptable to share upstream or downstream dependencies. As an example, affinity workloads could be used for applications within the same line of business and non-affinity workloads could be used for applications within different lines of business. Certain applications may be allocated a combination of affinity and non-affinity workloads. As an example, it may be acceptable for two applications to use the same database but unacceptable for these applications to use the same server.

Figure 3:
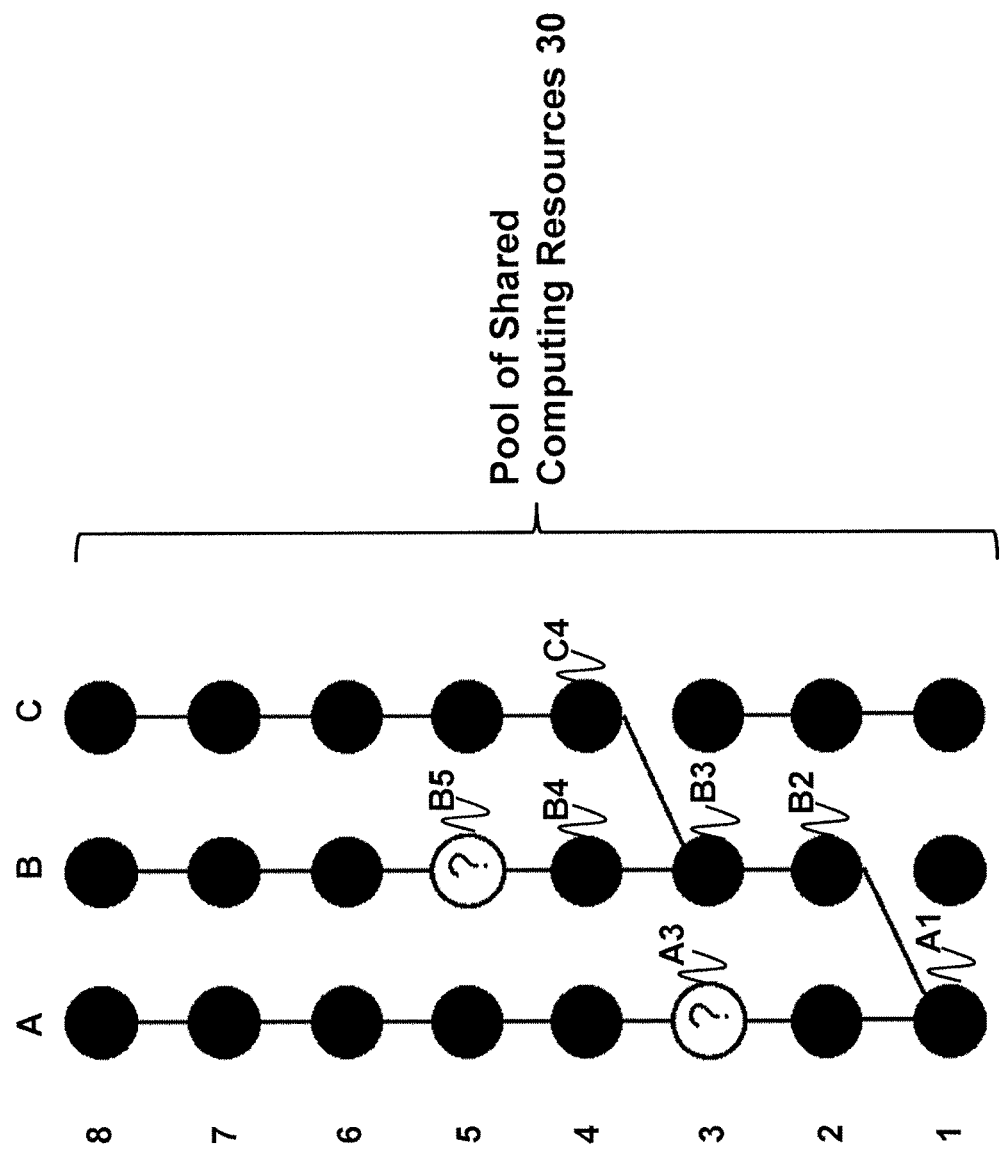
FIG. 3 illustrates an example of possible dependencies among computing resources, in accordance with certain embodiments of the present disclosure.

FIG. 3 illustrates an example of possible dependencies among computing resources, in accordance with certain embodiments of the present disclosure. FIG. 3 illustrates a pool of computing resources 30, wherein each dot represents a computing resource. The dots are organized into levels 1-8. The levels indicate upstream and downstream dependencies. As an example, level 7 may have an upstream dependency on level 8 and downstream dependencies on levels 1-6. Each level may represent a type of resource. As an example, level 1 could represent a network resource, level 2 could represent a storage resource, level 3 could represent a load balancer resource, level 4 could represent a name space resource, level 5 could represent a database resource, level 6 could represent a host resource, level 7 could represent an application resource, and level 8 could represent an external connectivity resource. Other embodiments may use any other types of resources, and the resources may be arranged in any suitable manner. For example, a load balancer resource could be arranged upstream of a storage resource in some embodiments and downstream of the storage resource in other embodiments.

FIG. 3 further illustrates the pool of shared computing resources 30 arranged into columns A, B, and C. Each column may represent different resources associated with the same level. It is possible for the resources within the same level to be redundant. As an example, level 1 may include a first network resource A1, a second network resource B1, and a third network resource C1 each capable of providing similar functionality. Thus, an application requiring a network resource may be assigned to any of network resource A1, B1, or C1. Resources within the same level are not required to be redundant. As an example, level 7 may include application resources comprising hardware or software customized for a particular application (such as a trading platform, an online banking platform, a loan platform, or other application). For simplicity, FIG. 3 illustrates each level as having three resources. However, each level can have any suitable number of resources and the different levels are not required to have the same number of resources (e.g., level 1 could have five resources and level 8 could have two resources).

The dots in FIG. 3 are connected by lines that indicate the dependencies. Assume that the applications supported by the computing resources 30 in FIG. 3 are designed to use separate streams, but every once in a while resources end up being shared. FIG. 3 illustrates a first stream that has dependencies on resources A8, A7, A6, A5, A4, A3, A2, and A1, a second stream that has dependencies on resources B8, B7, B6, B5, B4, B3, B2, and A1, and a third stream that has dependencies on resources C8, C7, C6, C5, C4, B3, B2, and A1. Thus, even though the streams are separate at the application level (the streams are separated into streams A7, B7, and C7), the streams share a downstream dependency at the network resource level (all streams depend on network resource A1). A problem with resource A1 would affect all three applications. Thus, network resource A1 presents a concentration risk.

As discussed above, embodiments of the present disclosure determine a concentration risk associated with each computing resource in a pool of shared computing resources. The resources within the pool can be determined based on system of record/asset inventory information. The concentration risk is determined on a common (physical/logical) fault domain. The concentration risk can be determined per computing resource, per level, per application, per stream, per resource pool, and/or other suitable granularity. In certain embodiments, the concentration risk may be determined by combining the risks associated with each level. The risk for a particular level may be weighted according to a gearing ratio/weighting factor/multiplier. As an example, a risk associated with a level that does not provide redundancy may have a higher weighting factor than a risk associated with a level that provides redundancy. As another example, a risk associated with a level that has a performance issue (e.g., based on utilization, errors/discards, peaks more than available) may have a higher weighting factor than a risk associated with a level that does not have a performance issue. As another example, a weighting factor may be higher if the level has a known bug or is suspected of being the target of a zero-day malware attack.

In certain embodiments, the risk can be weighted based on the extent to which a dependency can be confirmed. For example, an enterprise may have better visibility into dependencies within the enterprise as compared to dependencies related to third party resources within the cloud. In FIG. 3, the question mark for resource A3 indicates that resource A4 is suspected of having a dependency on resource A3 which is in turn suspected of having a dependency on resource A2. Similarly, the question mark for resource B5 indicates that resource B6 is suspected of having a downstream dependency on resource B5 which in turn is suspected of having a downstream dependency on resource B4. The suspected dependencies may be surmised based on observations of information going to/from the cloud or information about the cloud provider (e.g., historical performance or geographical information). However, due to lack of visibility, the dependency is unconfirmed. Thus, risks associated with these dependencies can be given less weight than risks associated with dependencies that can be confirmed or that otherwise have a higher likelihood of being accurate.

Any suitable formula may be used to determine the concentration risk, for example, depending on the desired granularity. In one embodiment, a concentration risk is determined for each level 1, 2, . . . n. The concentration risk for each level is multiplied by a weighting factor or gearing ratio, which can be determined based at least in part on the redundancy available at that level. The weighted concentration risks can be added together to obtain a risk score indicating a confidence level that a risk exists or an extent of the risk. In addition, the score can be increased if a performance risk or a security risk has been detected.

Concentration risk can be determined at any suitable interval. In an embodiment, a data point is determined every five minutes. The data point may be an instantaneous value or an average for the 5 minute time period. The concentration risk can be evaluated over a time period, such as 24 hours, to see when spikes occur. This information can be used to set the thresholds that warn the system operator of concentration risks. The thresholds can be adjusted based on time of day. For example, if the concentration risk has exceeded a first threshold X times during business hours, that may be considered to be higher risk than if the concentration risk exceeds the first threshold X times during off hours (e.g., when the system performs internal batch processing rather than customer-facing applications).

Certain embodiments may allow a system operator/administrator to define rules or set preferences indicating which layer(s) of technology are allowed or disallowed from having the affinity or anti-affinity relationship. As one example, the system operator/administrator may define a rule or preference that allows application A to have an affinity relationship with application B at level 1, but disallows application A from having an affinity relationship with application B at level 7. If the dynamic allocation and migration of resource results in deviation from such rules/preferences, a notification can be raised.

In certain embodiments, the administrator of such layer of the technology can also use the rules/preferences to better allocate and share the underlying resources. As one example, suppose an enterprise supports applications A, B, and C. Suppose application A tends to place significant demand on level X resources, whereas applications B and C tend to use level X resources more lightly. For example, level X resources could be used to report logs, and application A may tend to generate more voluminous logs than applications B and C. To maintain sufficient capacity for application A at level X, the system operator/administrator could set a rule or preference that allows application types B and C to have affinity at level X and/or requires application type A to have anti-affinity at level X.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order unless explicitly stated otherwise.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A system comprising:
processing circuitry and memory comprising logic, the processing circuitry operable to execute the logic whereby the system is operable to:
monitor a pool of shared computing resources, wherein each computing resource within the pool of shared computing resources is capable of being allocated dynamically in order to support one or more applications;
determine a concentration risk associated with a first computing resource of the pool of shared computing resources, the concentration risk based on an extent to which the one or more applications have upstream or downstream dependencies on the first computing resource, the concentration risk comprises a first level risk weighted by a first weighting factor plus a second level risk weighted by a second weighting factor, the first level risk based on the extent to which the one or more applications have the upstream or downstream dependencies on the first computing resource and the second level risk based on the extent to which the one or more applications have upstream or downstream dependencies on a second computing resource of the pool of shared computing resources; and
perform an action in response to determining that the concentration risk exceeds a threshold, wherein the action comprises communicating a notification to a system operator and/or initiating a remediation step configured to reduce the concentration risk associated with the first computing resource.

2. The system of claim 1, wherein the concentration risk is determined at least in part based on a real-time utilization of the first computing resource.

3. The system of claim 1, wherein the concentration risk is determined at least in part based on a security risk associated with the first computing resource.

4. The system of claim 1, wherein the concentration risk is determined at least in part based on a priority associated with the one or more applications that have the upstream or downstream dependencies on the first computing resource.

5. The system of claim 1, wherein the concentration risk is determined at least in part based on detecting performance degradation associated with the one or more applications that have the upstream or downstream dependencies on the first computing resource.

6. The system of claim 1, wherein the first computing resource comprises a cloud-based resource maintained by a cloud provider and the concentration risk is weighted based on a geographical location of the first computing resource and/or historical performance of the cloud provider.

7. The system of claim 1, wherein the concentration risk is determined at least in part based on a frequency and/or duration of congestion experienced by the first computing resource.

8. The system of claim 1, wherein the upstream or downstream dependencies are determined at a physical layer.

9. The system of claim 1, wherein the upstream or downstream dependencies are determined at a logical layer.

10. A method, comprising:
monitoring a pool of shared computing resources, wherein each computing resource within the pool of shared computing resources is capable of being allocated dynamically in order to support one or more applications;
determining a concentration risk associated with a first computing resource of the pool of shared computing resources, the concentration risk based on an extent to which the one or more applications have upstream or downstream dependencies on the first computing resource, the concentration risk comprises a first level risk weighted by a first weighting factor plus a second level risk weighted by a second weighting factor, the first level risk based on the extent to which the one or more applications have the upstream or downstream dependencies on the first computing resource and the second level risk based on the extent to which the one or more applications have upstream or downstream dependencies on a second computing resource of the pool of shared computing resources; and
performing an action in response to determining that the concentration risk exceeds a threshold, wherein the action comprises communicating a notification to a system operator and/or initiating a remediation step configured to reduce the concentration risk associated with the first computing resource.

11. The method of claim 10, wherein the concentration risk is determined at least in part based on a real-time utilization of the first computing resource.

12. The method of claim 10, wherein the concentration risk is determined at least in part based on a security risk associated with the first computing resource.

13. The method of claim 10, wherein the concentration risk is determined at least in part based on a priority associated with the one or more applications that have the upstream or downstream dependencies on the first computing resource.

14. The method of claim 10, wherein the concentration risk is determined at least in part based on detecting performance degradation associated with the one or more applications that have the upstream or downstream dependencies on the first computing resource.

15. The method of claim 10, wherein the first computing resource comprises a cloud-based resource maintained by a cloud provider and the concentration risk is weighted based on a geographical location of the first computing resource and/or historical performance of the cloud provider.

16. The method of claim 10, wherein the concentration risk is determined at least in part based on a frequency and/or duration of congestion experienced by the first computing resource.

17. The method of claim 10, wherein the upstream or downstream dependencies are determined at a physical layer.

18. The method of claim 10, wherein the upstream or downstream dependencies are determined at a logical layer.

19. A non-transitory medium comprising logic that, when executed by processing circuitry, is operable to:
    monitor a pool of shared computing resources, wherein each computing resource within the pool of shared computing resources is capable of being allocated dynamically in order to support one or more applications;
    determine a concentration risk associated with a first computing resource of the pool of shared computing resources, the concentration risk based on an extent to which the one or more applications have upstream or downstream dependencies on the first computing resource, the concentration risk comprises a first level risk weighted by a first weighting factor plus a second level risk weighted by a second weighting factor, the first level risk based on the extent to which the one or more applications have the upstream or downstream dependencies on the first computing resource and the second level risk based on the extent to which the one or more applications have upstream or downstream dependencies on a second computing resource of the pool of shared computing resources; and
    perform an action in response to determining that the concentration risk exceeds a threshold, wherein the action comprises communicating a notification to a system operator and/or initiating a remediation step configured to reduce the concentration risk associated with the first computing resource.

\* \* \* \* \*